United States Patent [19]
Conley

[11] 3,882,951
[45] May 13, 1975

[54] QUIET SLIDE OUT ENGINE VEHICLE

[75] Inventor: Challie Conley, West Covina, Calif.

[73] Assignee: Hallamore Inc., Fountain Valley, Calif.

[22] Filed: Jan. 22, 1973

[21] Appl. No.: 325,513

[52] U.S. Cl......... 180/64 L; 123/41.49; 123/198 E; 180/54 A; 180/69.1; 181/33 K; 296/31 P
[51] Int. Cl............................................. B60k 5/10
[58] Field of Search..... 180/64 L, 64 R, 68 R, 68 P, 180/54 A, 12, 11, 69.1; 181/33 K; 296/31 P; 123/198 E, 41.49

[56] References Cited
UNITED STATES PATENTS

| | | | |
|---|---|---|---|
| 1,120,106 | 12/1914 | Twombly | 180/64 R |
| 2,613,754 | 10/1952 | Van Doorne | 180/64 L |
| 3,149,553 | 9/1964 | Solzman | 181/33 K UX |
| 3,412,724 | 11/1968 | Scheiterlein et al. | 180/64 R X |
| 3,451,571 | 6/1969 | Brisson | 180/64 L X |
| 3,550,713 | 12/1970 | Swanson et al. | 180/64 R |
| 3,684,053 | 8/1972 | Fachbach et al. | 123/198 E X |

FOREIGN PATENTS OR APPLICATIONS

| | | | |
|---|---|---|---|
| 567,567 | 2/1945 | United Kingdom | 181/33 K |
| 1,914,997 | 10/1969 | Germany | 296/31 P |

Primary Examiner—David Schonberg
Assistant Examiner—Milton L. Smith
Attorney, Agent, or Firm—Jackson & Jones

[57] ABSTRACT

A vehicle has a slidable engine mounting frame that is relatively movable with respect to the chassis frame. The engine can be disconnected from the vehicle body in a short period of time. Both the electrical connections and fluid connections between the engine and the vehicle body are designed to permit a unitary disconnection through module panels mounted on the chassis main frame member. The vehicle housing body includes sound deadening insulation surrounding the upper portion of the engine. A pan member extends across the bottom of the engine to reflect engine sounds upward into the sound deadening insulation. The shroud for the fan is specially designed to lessen the air flow noise. An auxiliary drive shaft for the fan is connected through a flexible coupling member and is designed specifically to drive accessory items.

12 Claims, 6 Drawing Figures

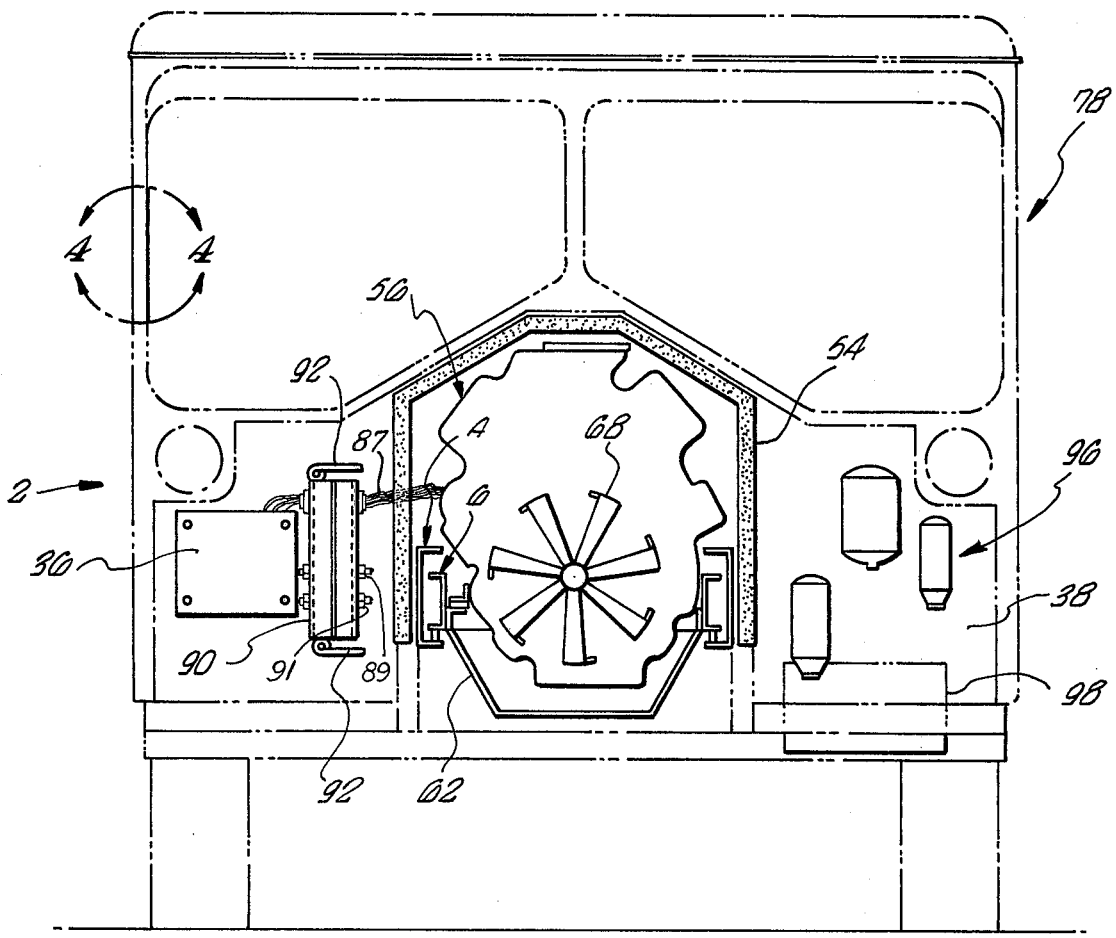
FIG_1.
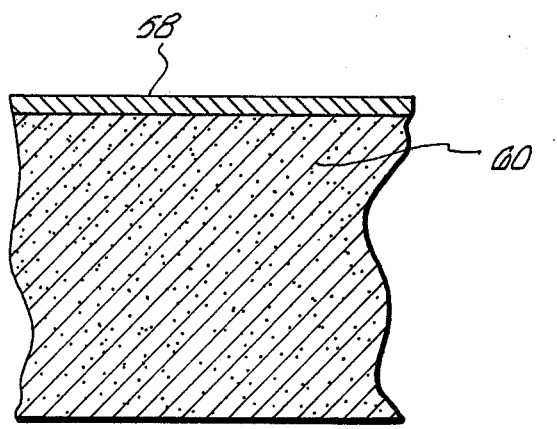
FIG_3.

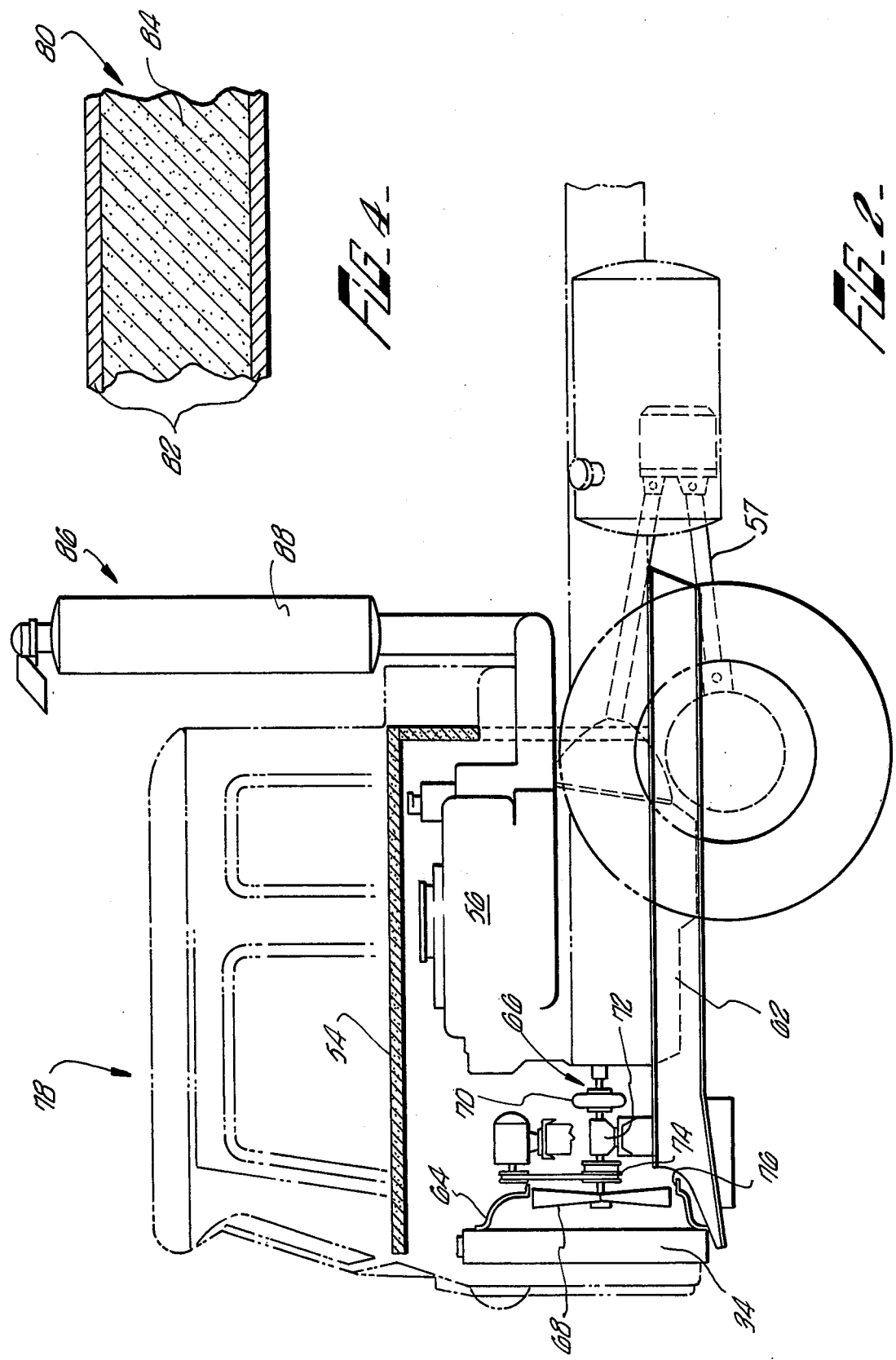

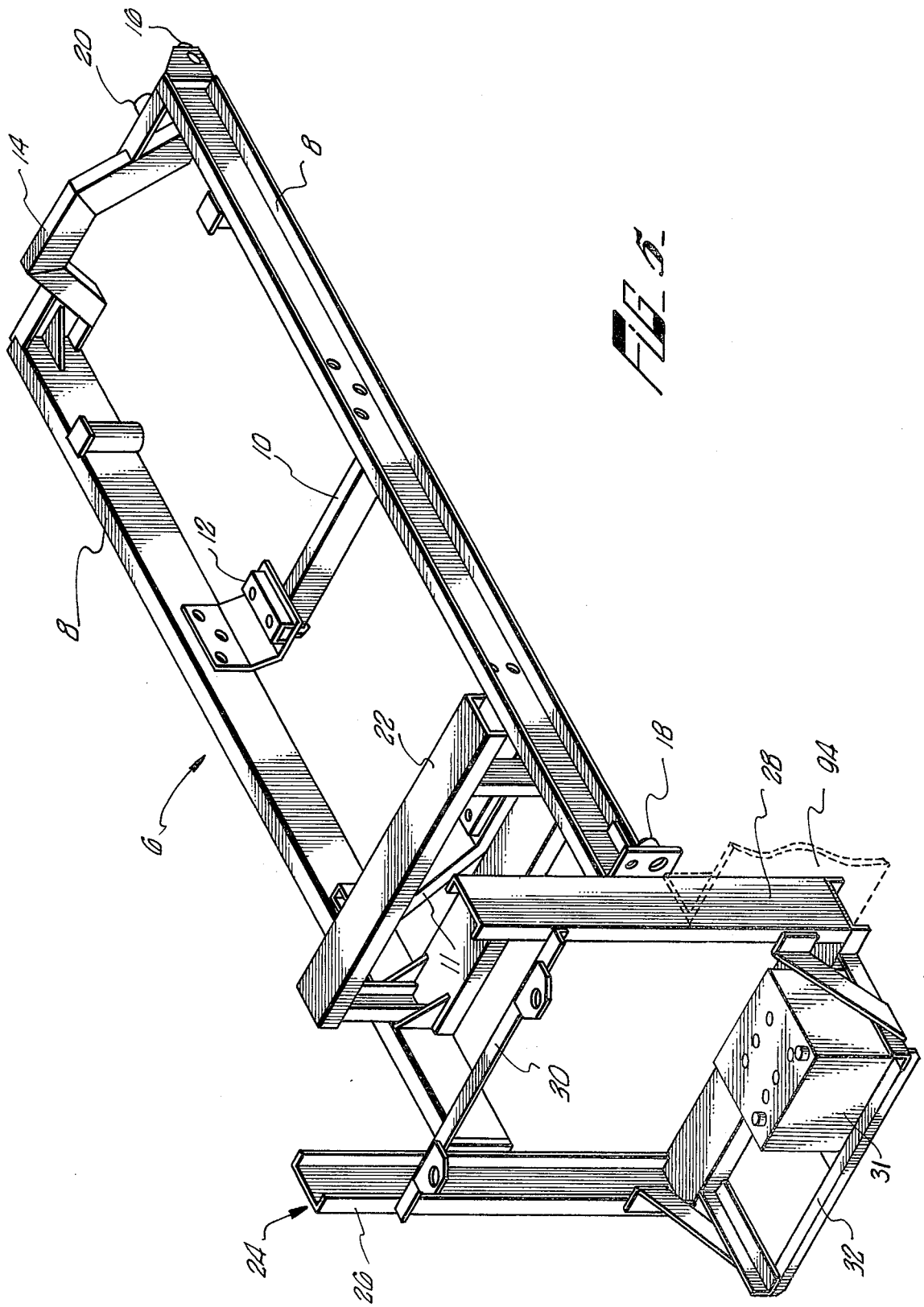

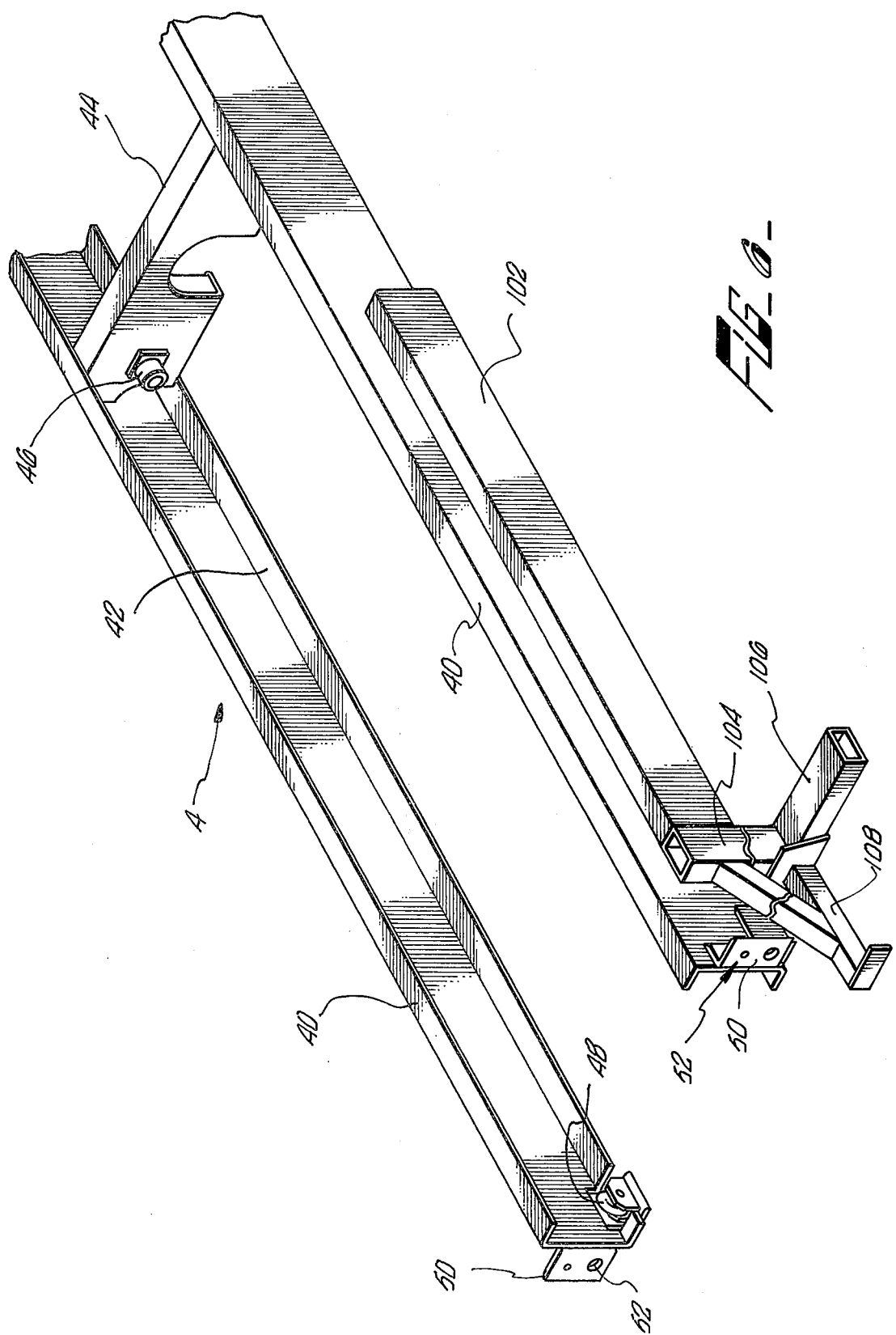

QUIET SLIDE OUT ENGINE VEHICLE

BACKGROUND OF THE INVENTION

1. Field of the Invention

The present invention is directed to vehicles and more particularly to trucks that are both quiet and easily serviceable.

2. Description of the Prior Art

Federal and state noise regulations have increased in their stringent demands particularly with respect to vehicles. It has been found that some conventional refuse trucks produce an in-cab noise of nearly 100 decibels at full throttle. Most refuse trucks will register in excess of 86 decibels in the 50 foot drive-by test that is currently used by most noise enforcement agencies. A number of states require trucks to produce less than 88 decibels in the 50 foot drive-by test. In addition, interior cab noise is required under federal law to be under 90 decibels over an 8 hour period.

In addition to the stringent noise requirements, the high operational overhead of a truck requires it to be in service the maximum amount of time. Thus, any repairs required on the truck that takes it out of service can be extremely expensive both for the cost of the repair but more particularly for the lost revenues that are directly correlated with downtime of the truck. This bocomes a particular problem when the truck carries special equipment that cannot be readily hooked up with another cab. The field of refuse trucks is extremely sensitive to the above problems since the refuse truck is generally required to operate in a stop-and-go fashion in residential areas. A city will frequently have to purchase 120 percent of their operative refuse truck requirements in order to insure that a sufficient number of trucks will be serving the community. Repairs to the engine are the most frequent and it is necessary to retain 20 percent of the trucks as replacement vehicles to compensate for the downtime resulting from repairs.

As a further problem, refuse trucks are frequently subject to vandalism in the communities in which they operate and in some cases, even by their drivers.

SUMMARY OF THE INVENTION

The present invention provides a vehicle that is easily repaired by specially mounting an engine that can be replaced with a spare engine within 1 hour. This is possible by the use of an engine mounting froma that is removable from the vehicle body and is designed specifically to accommodate both the engine and the accessory components.

In addition, the vehicle is designed to operate extremely quietly by the use of a special fiberglass shroud positioned over the engine in combination with a lower pan member that is designed to reflect the noise into the noise insulating material of the shroud. The muffler is also shrouded with fiberglass to maintain a low noise output. To help reduce the noise heard by the operator, the cab is made of a molded fiberglass sandwich panel that both reduces weight and insulates sound.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 1 is a front cross-sectional view of the vehicle of the present invention;

FIG. 2 is a side cross-sectional view of the vehicle of the present invention;

FIG. 3 is a cross sectional view of the engine shroud;

FIG. 4 is an enlarged sectional view of the fiberglass cab wall taken along lines 4—4 of FIG. 1;

FIG. 5 is a perspective view of the engine mounting frame of the present invention; and FIG. 6 is a perspective view of the chassis frame of the present invention.

DESCRIPTION OF THE PREFERRED EMBODIMENT

Referring to FIG. 1 of the drawings, a front cross-sectional view of a vehicle or truck 2 of the present invention is disclosed with various components of the truck removed or shown only in schematic form. The engine mounting frame 6 is shown within the front chassis frame 4 supported on movable bearing members to be described subsequently.

FIG. 5 presents a detailed view of the engine mounting frame 6. The mounting frame 6 includes a pair of side rails 8 formed from U-shaped steel beams. Interconnecting the side rails 8 are front and middle cross bars 11 and 10 carrying engine mounts 12. Interconnecting the side rails 8 at the rear end, a rear cross bar 14 extends over the drive train 57 of the engine. Rear roller bearing wheels 16 are provided to facilitate the movement of the engine mounting frame 6 into and out of the vehicle 2. A pair of front alignment pins 18 and rear alignment pins 20 are provided adjacent the end of each side rail 8. The front mounting bar 22 provides additional strength between the side rails 8 and is also adapted to support the accessory equipment.

The front support rack 24 comprises a pair of vertical U-beams 26 and 28 interconnected by a radiator support beam 30 and a lower platform 32. The rack 24 is designed to carry not only a radiator 34 but also provides support on the lower platform 32 to carry batteries 31. Modules or panel members such as the electric circuit panel 36 and the filter module or panel 38 can be mounted on either side of the front support member 8. In the preferred embodiment, the panel 36 is connected to the vehicle frame while the filter module 38 is on the movable mounting frame 6 as shown at 94 of FIG. 5.

Referring to FIG. 6, the chassis frame 4 that is connected to the vehicle body is disclosed in a perspective view. U-shaped beams 40 form each side of the chassis frame 4. The inside portion of the U-shaped beams 40 serve as rails or tracks 42 to accommodate the engine mounting frame 6. A rear chassis support member 44 interconnects the side U-shaped beams 40 and is adapted to acccommodate the drive train 57. The various support members and cross bars in both the chassis frame 4 and the engine mounting frame 6 can be attached by either bolts or welding. A sub frame 102 on the outside of each beam 40 is adapted to be connected with spring brackets (not shown). The sub frame 102 helps provide a longer axle to provide a stable wide track to the vehicle wheels. A drop cross member 104 is connected to a frame support beam 106 for supporting the cab 78. A front support 108 can act as both a tow bar and as a support for bumper brackets (not shown).

Pin sockets 46 are mounted on each side of the rear chassis support member 44 to receive the pins 20 of the engine mounting frame.

The front of the chassis frame 4 includes a pair of roller bearing wheels 48 adapted to support the forward portion of the engine mounting frame 6. Adjacent the roller bearing wheels 12 are mounted respectively on each U-shaped beam 40, pin socket brackets 50 that are adapted to receive the engine frame pins 18. In addition, anchor bolt holes 52 are provided for locking the chassis frame 4 and the engine mounting frame 6 together.

Referring to FIGS. 1 and 2, a fiberglass shroud or tunnel 54 forms an engine tunnel compartment across the top and sides of the engine 56. The shroud 54 is constructed of a 1/4th of an inch thick fiberglass base 58 with a 2 inch thick 1½ pound per square foot density spun fiberglass sound deadening material 60. The shroud 54 extends around three sides of the engine 56 from the fire wall forward to the radiator 34. The fire wall itself can be enclosed with a similar thickness of sound deadening fiberglass material as shown in FIG. 2.

Attached to the movable engine mounting frame 6 is a fiberglass pan 62 which extends beneath both the engine 56 and a portion of the transmission and drive train 57. The pan 62 is designed to be movable with the engine mounting frame 6 and to optimally reflect engine noise upward into the sound deadening material 60.

FIG. 3 discloses a cross-sectional view of the full engine tunnel compartment. As can be seen from FIG. 3, the fiberglass base 58 supports the sound deadening fiberglass material 60.

The fiberglass pan 62 not only reflects the sound upward into the sound deadening material 60 but further protects the engine 56 and transmission from road grime and increases cooling of the engine 56. The fiberglass pan 62 also helps isolate the engine 56 from vandalism. The pan 62 is open adjacent the radiator 34 and a fan shroud 64 thereby permitting increased air flow around the engine 56 for both cooling and reflecting noise back up into the noise absorbing material 60. This is particularly helpful considering the heat problem that generally arises with the continual stop-and-go operation of the engine 56 in a refuse operation.

Referring particularly to FIG. 2, an elongated auxiliary power shaft 66 is disclosed extending from the engine 56 for ultimate connection with a machete tipped fan 68. A flexible coupling 70 is included in the power shaft 66. The flexible coupling 70 helps to remove both vibration and noise. A bearing member 72 which may include a front and rear ball bearing assembly (not shown) supports the power shaft 66 and rests on the mounting bar 22. Sheaves 74 are provided for removing power to drive accessory equipment such as pumps, generators, etc. The machete tipped fan 68 is housed by a fiberglass shroud 64 having a curved exit lip 76 specifically designed to permit the egress of a relatively noiseless air flow from the machete tipped fan 68. The arrangement of the elongated auxiliary power shaft 66 connected to the engine 56 is particularly useful in accommodating the accessory equipment so that they can be readily disconnected to permit the removal of the engine 56.

The cab 78 can be attached to the vehicle frame by only four bolts and consists of a fiberglass panel wall 80 that can be seen in FIG. 4. The cab panel 80 is corrosion resistant, has a high impact strength and can be easily repaired. Color can be molded into it if desired. The cab panel 80 consists of an inner and outer ⅛ inch solid fiberglass panel member 82 enclosing a urethane foam core 84 1 inch thick. The core 84 is a layer of rigid plastic foam that insulates against noise, cold and heat. The fiberglass resins and adhesives used in making the cab panel 80 are self extinguishing to eliminate the danger of fire.

The use of the fiberglass pan 62 and the sound deadening fiberglassing material 60 on the engine tunnel shroud 54 along with the fiberglass construction of the cab panel 80 permits the vehicle to be maintained in the 78 decibel range during the fifty foot drive-by test currently in use by most noise enforcement agencies in the country. This is generally ten decibels below the toughest current state noise limit requirements and in effect results in a noise level that will be half as noisey to the human ear as for example a truck producing 88 decibels. In addition, the interior cab noise which has long been a problem in refuse trucks is drastically reduced so that even at full throttle, the noise in the truck cab 78 will be within the 88 decibel range. This solution to the noise problem particularly in refuse trucks is important because trucks operate in residential areas often early in the morning.

The exhaust system 86 can be a muffler wrapped in fiberglass and asbestos 88 for quelling noise.

Referring to FIG. 1, the electrical system or circuit panel 36 is located in a module that is permanently mounted to the cowl under the grill of the cab 78. The circuit panel 36 is designed to permit a quick disconnection of the electric wires connected to the engine 56. In addition, a quick disconnection of the electrical connectors 87 air brake lines, power steering oil line 89 and fuel line 91 can be provided through the use of a clamp disconnect member 90 reference is made to the Swanson U.S. Pat. No. 3,550,713 to disclose just one form of a disconnect unit. Check valves (not shown) are provided with member 90 to prevent any leakage of fluid once the lines have been disconnected. As can be seen in FIG. 1, the quick disconnect clamp 90 can employ over-centered latches 92 or if desired be merely bolted together.

The front lower platform 32 on the engine mounting member 6 can support batteries 31 while off to one side a cantilevered bracket or panel 94 can be welded or bolted to the engine mounting frame 6 to carry the engine oil, transmission oil and fuel filters schematically illustrated as element 96. A heater 98 for the cab can also be mounted behind the bracket panel 94 as part of the slide out engine mounting member 6.

If repair is necessary to the engine 56, it is possible to remove the front grill and release the anchor bolts (not shown) from the anchor holes 52. This permits the engine mounting member 6 to slide freely in the chassis frame 4. Separation of the engine's 56 electrical and fluidic lines through the electrical panel 36 individually and/or through the clamp disconnect member 90 permits the engine 56 to be rolled forward out of the chassis of the vehicle within approximately 20 minutes. With this slide out capability, repairs on the present vehicle that used to require many hours with a conventional tilt-cab may be completed in a matter of minutes.

The present invention frees the mechanic from working under the vehicle on a creeper or over a wheel in a restricted space. If a large degree of downtime is expected, a complete engine exchange employing a slide out spare engine may be completed in merely 40 minutes. With the use of a slide out auxiliary engine, the vehicle itself can be returned to service while the repair can be done insuring a maximum quality control of both repair and preventive maintenance. In addition, the placing of the electrical connections under the cab and away from the dashboard of the cab 78 prevents any tampering with the electrical system of the vehicle. Each of the components utilized in the vehicle of the present invention can be standard shelf components.

It should be noted that various modifications can be made to the apparatus while still remaining within the purview of the following claims.

What is claimed is:

1. A vehicle having a housing body, an engine connected to a drive train for moving the vehicle, a source of electrical power such as electrical batteries, electrical power means extending between the engine and the vehicle housing and fluid conduit means extending between the engine and the vehicle housing comprising:
   a chassis frame member including two interconnected parallel chassis rails mounted on the housing body;
   a movable engine mounting member including two parallel mounting rails interconnected and supporting the engine and a lower supporting member connected to and movable with the two mounting rails, the lower supporting member supporting the source of electrical power;
   roller means positioned between the respective chassis rails and the mounting rails for permitting the mounting rails to be relatively movable on the chassis frame whereby the engine can be moved along the chassis frame member out of the housing body adjacent a first end of the chassis frame member;
   means for interlocking the chassis frame member and the movable engine mounting member;
   means for alignment of the engine mounting member with the chassis frame member, and
   means adjacent the movable engine mounting member for disconnecting the electrical power means and the fluid conduit means between the engine and the vehicle housing.

2. The invention of claim 1 wherein the lower support member extends between the mounting rails adjacent the first end of the chassis frame member when the chassis frame member and the movable engine mounting member are interlocked.

3. The invention of claim 1 wherein the means for disconnecting the electrical power means and the fluid conduit means include a module member permitting a unitary disconnection of both the electrical power means and the fluid conduit means between the engine and the vehicle housing whereby the engine can be quickly removed from the vehicle.

4. The invention of claim 1 wherein the vehicle housing body includes sound deadening insulation surrounding the upper portion of the engine and the movable engine mounting member further includes a pan member extending across the bottom of the engine to reflect engine sounds upward into the sound deadening insulation.

5. The invention of claim 1 wherein the engine further includes an elongated auxiliary drive shaft extending from the front of the engine relative to the drive train, a fan connected to the shaft, means for removing rotational power from the shaft, bearing means for the shaft mounted on the movable engine mounting member and a flexible coupling member connecting the shaft to the engine.

6. The invention of claim 4 wherein the vehicle includes a molded fiberglass walled cab portion for the operator, the cab wall includes outer layers of solid fiberglass panels and an interior core of plastic foam.

7. The invention of claim 1 wherein the engine mounting member further includes a fluid filter supporting member adapted to support fluid filters for the engine.

8. A wheeled vehicle of the type capable of hauling bulk items such as refuse having an engine with an exhaust system including a muffler, the engine connected on one side to a drive train for driving the vehicle, comprising;
   a housing body having a molded fiberglass wall cab portion for the operator, the cab wall including outer layers of solid fiberglass panels and an interior core of sound deadening plastic material;
   a chassis frame member adapted to be mounted on the vehicle adjacent the cab portion;
   a movable engine mounting member adapted to mount the engine;
   means for permitting the engine mounting member to be relatively movable on the chassis frame whereby the engine can be moved along the chassis frame member out of the housing body;
   means for interlocking the chassis frame member and the movable engine mounting member;
   engine housing means fixedly attached to the housing body and surrounding the upper portion of the engine for absorbing sound, and
   a pan member extending across the mounting member to cover the bottom of the engine, the pan member being open on the other side of the engine relative to the drive train to increase air flow around the engine and to assist in reflecting engine noise upward into the engine housing means for absorbing sound whereby the cab wall and engine housing means reduce the sound level both externally of the housing body and in the interior of the cab portion occupied by the operator.

9. The invention of claim 8 including means for mounting fluid filters that can be connected to the engine, on the movable engine mounting member externally of the engine housing means for absorbing sound.

10. The invention of claim 8 wherein the engine further includes a radiator and a fan and a fiberglass shroud, the edges of the shroud adjacent to the fan being curved to lessen air flow noise.

11. The invention of claim 8 further including exhaust sound absorbing means surrounding the muffler to reduce exhaust sounds from the engine.

12. The invention of claim 8 wherein the engine mounting member includes a lower supporting member mounted externally of the engine housing means for absorbing sound and adapted to support electrical batteries.

* * * * *